United States Patent
Ayari et al.

(10) Patent No.: US 10,499,031 B2
(45) Date of Patent: Dec. 3, 2019

(54) 3D RECONSTRUCTION OF A REAL OBJECT FROM A DEPTH MAP

(71) Applicant: Dassault Systemes, Velizy Villacoublay (FR)

(72) Inventors: Mohamed Amine Ayari, Velizy Villacoublay (FR); Vincent Guitteny, Paris (FR)

(73) Assignee: Dassault Systemes, Velizy Villacoublay (FR)

( * ) Notice: Subject to any disclaimer, the term of this patent is extended or adjusted under 35 U.S.C. 154(b) by 92 days.

(21) Appl. No.: 15/701,109

(22) Filed: Sep. 11, 2017

(65) Prior Publication Data

US 2018/0077400 A1 Mar. 15, 2018

(30) Foreign Application Priority Data

Sep. 12, 2016 (EP) .................................. 16188268

(51) Int. Cl.
| | | |
|---|---|---|
| G06K 9/00 | (2006.01) | |
| H04N 13/111 | (2018.01) | |
| G06N 20/00 | (2019.01) | |
| H04N 13/271 | (2018.01) | |

(Continued)

(52) U.S. Cl.
CPC ....... *H04N 13/111* (2018.05); *G06K 9/00208* (2013.01); *G06N 20/00* (2019.01); *G06T 17/20* (2013.01); *H04N 13/271* (2018.05); *G06K 9/00369* (2013.01);
(Continued)

(58) Field of Classification Search
CPC ........... G06K 9/00208; G06K 9/00369; G06N 20/00; G06T 17/20; G06T 2207/20081; G06T 2207/20084; H04N 13/111; H04N 13/257; H04N 13/271
See application file for complete search history.

(56) References Cited

U.S. PATENT DOCUMENTS

| | | |
|---|---|---|
| 5,488,692 A | 1/1996 | Karasick |
| 6,549,201 B1 | 4/2003 | Igarashi et al. |
| 6,654,027 B1 | 11/2003 | Hernandez |

(Continued)

FOREIGN PATENT DOCUMENTS

| | | |
|---|---|---|
| CN | 104 794 722 | 7/2015 |
| CN | 105 657 402 | 6/2016 |

(Continued)

OTHER PUBLICATIONS

Alj, Y. et al., "Multi-Texturing 3D Models: How to Choose the Best Texture?," IC3D Belgium (2012), hal-00785836, Version 1, 8 pages (Feb. 7, 2013).

(Continued)

*Primary Examiner* — Bhavesh M Mehta
*Assistant Examiner* — Ian L Lemieux
(74) *Attorney, Agent, or Firm* — Hamilton, Brook, Smith & Reynolds, P.C.

(57) ABSTRACT

The invention notably relates to a computer-implemented method for learning a function configured for reconstructing, for a class of real objects, a 3D modeled object that represents an instance of the class from a depth map of the instance. The method comprises providing a parametric model of the class, creating a database, and learning the function with the database. The method improves the 3D reconstruction of a real object from a depth map.

20 Claims, 5 Drawing Sheets

(51) Int. Cl.
*G06T 17/20* (2006.01)
*H04N 13/257* (2018.01)
(52) U.S. Cl.
CPC ............... *G06T 2207/20081* (2013.01); *G06T 2207/20084* (2013.01); *H04N 13/257* (2018.05)

(56) References Cited

U.S. PATENT DOCUMENTS

| | | | |
|---|---|---|---|
| 7,130,776 B2* | 10/2006 | Ii | G06K 9/6256 |
| | | | 703/2 |
| 8,570,343 B2 | 10/2013 | Halstead | |
| 9,111,348 B2* | 8/2015 | Amma | G06T 7/75 |
| 9,760,837 B1* | 9/2017 | Nowozin | G01S 7/4808 |
| 9,886,528 B2 | 2/2018 | Rameau | |
| 9,886,530 B2 | 2/2018 | Mehr | |
| 9,987,177 B2 | 5/2018 | Mehr | |
| 10,013,801 B2 | 7/2018 | Mehr | |
| 2002/0028418 A1 | 3/2002 | Farag | |
| 2002/0172413 A1 | 11/2002 | Chen | |
| 2007/0008312 A1 | 1/2007 | Zhou | |
| 2009/0284550 A1 | 11/2009 | Shimada et al. | |
| 2010/0197395 A1* | 8/2010 | Geiss | G06T 7/251 |
| | | | 463/31 |
| 2011/0295564 A1 | 12/2011 | Chazel | |
| 2013/0251241 A1 | 9/2013 | Kunkel | |
| 2013/0321403 A1 | 12/2013 | Piemonte | |
| 2014/0064581 A1 | 3/2014 | Madbhushi | |
| 2014/0267279 A1 | 9/2014 | Kontkanen | |
| 2014/0340489 A1 | 11/2014 | Medioni | |
| 2014/0358496 A1 | 12/2014 | Rameau et al. | |
| 2014/0362091 A1 | 12/2014 | Bouaziz et al. | |
| 2015/0172628 A1 | 6/2015 | Brown | |
| 2015/0213646 A1 | 7/2015 | Ma et al. | |
| 2015/0279118 A1 | 10/2015 | Dou et al. | |
| 2015/0347846 A1 | 12/2015 | Guzman-Rivera et al. | |
| 2016/0127715 A1 | 5/2016 | Shotton et al. | |
| 2016/0163083 A1* | 6/2016 | Barmpoutis | G06T 13/40 |
| | | | 345/419 |
| 2017/0168586 A1* | 6/2017 | Sinha | G06F 3/017 |
| 2017/0193699 A1 | 7/2017 | Mehr et al. | |
| 2018/0182071 A1* | 6/2018 | Ayari | G06T 5/002 |

FOREIGN PATENT DOCUMENTS

| | | |
|---|---|---|
| EP | 0 822 522 | 2/1998 |
| WO | WO 2011/142734 | 11/2011 |
| WO | WO 2012/048304 | 4/2012 |
| WO | WO 2013/189058 | 12/2013 |
| WO | WO 2016/050290 | 4/2016 |

OTHER PUBLICATIONS

Allène, C., et al.,"Seamless Image-Based Texture Atlases using Multi-band Blending," 4 pages, (2008).
Azariadis, P.N., et al., "Drawing curves onto a cloud of points for point-based modelling," Computer-Aided Design, 37(1): 109-122 (Jan. 1, 2005).
Baumberg, A., "Blending images for texturing 3D models," BMVC 2002, 404-413 (2002).
Bernardini, F., et al., "High-Quality Texture Reconstruction from Multiple Scans," 14 pages, (2001).
Callieri, M., et al., "Masked Photo Blending: mapping dense photographic dataset on high-resolution sampled 3D models," (Jan. 8, 2008).
Canny, J., "A Computational Approach to Edge Detection," IEEE Transactions on Pattern Analysis and Machine Intelligence, PAMI-8(6): 679-698 (Nov. 1986).
Carr, N.A. et al.., "Meshed Atlases for Real-Time Procedural Solid Texturing," ACM Transactions on Graphics, 21(2): 26 pages (Apr. 2002).

Clark, X.B., et al., "An Investigation into Graph Cut Parameter Optimisation for Image-Fusion Applications", IVCNZ '12, Dunedin, New Zealand, 6 pages (Nov. 26-28, 2012).
Colburn, A., et al., "Image-Based Remodeling," IEEE Transactions on Visualization and Computer Graphics, 13 pages (2012).
Cui, Y. et al., "3D Shape Scanning with a Time-of-Flight Camera," 8 pages (2010).
Debevec, P.E., et al., "Modeling and Rendering Architecture from Photographs: A hybrid geometry-and image-based approach," Presented at Computer Graphics Proceedings, Annual Conference Series, New Orleans, Lousiana, pp. 11-20 (Aug. 4-9, 1996).
Dellepiane, M., et al., "Flow-based local optimization for image-to-geometry projection," IEEE Transactions on Visualization and Computer Graphics, pp. 1-12, (2012).
Dutton, R.D., et al., "Efficiently Identifying the Faces of a Solid," Computers and Graphics, 7:(2) :143-147 (1983).
Dutagaci, H., et al., "Evaluation of 3D interest detection techniques via human-generated ground truth," Vis Comput 28: 901-917; Jun. 29, 2012.
Eisemann, M. et al., "Floating Textures," Eurographics, 27(2): 10 pages (2008).
European Search Report and Written Opinion for European Application No. EP13305751, completed Oct. 28, 2013.
European Search Report for European Application No. EP13306576 entitled "Computing Camera Parameters," completed Mar. 26, 2014.
Fabbri, R. et al., "3D Curve Sketch: Flexible Curve-Based Stereo Reconstruction and Calibration," 2010 IEEE Conference on Computer Vision and Pattern Recognition (CVPR), Jun. 13-18, 2010, San Francisco, CA, USA, pp. 1538-1545.
Goldlücke, B. and Cremers, D., "A Superresolution Framework for High-Accuracy Multiview Reconstruction," 10 pages, (2014).
Hale, J.G. "Texture re-mapping for decimated polygonal meshes," University of Edinburgh, pp. 1-12, (1998).
Hanrahan, P., "Creating Volume Models from Edge-Vertex Graphs," Proceedings of the 9th Annual Conference on Computer Graphics and Interactive Techniques, Siggraph '82, vol. 16, 1982, pp. 77-84.
Hanusch, T., "A New Texture Mapping Algorithm for Photorealistic Reconstruction of 3D Objects," The International Archives of the Photogrammetry, Remote Sensing and Spatial Information Sciences, Beijing, vol. XXXVII(Part B5): 699-706 (2008).
Inoue, K., et al.,"Solid Model Reconstruction of Wireframe CAD Models Based on Topological Embeddings of Planar Graphs," 2003.
Ishikawa, H., "Higher-Order Clique Reduction in Binary Graph Cut," IEEE, pp. 2993-3000 (2009).
Jian-dong, Z. et al., "3D curve structure reconstruction from a sparse set of unordered images," Computers in Industry, 60(2): 126-134 (Feb. 1, 2009).
Kappes, J.H. et al., "A Comparative Study of Modern Inference Techniques for Discrete Energy Minimization Problems," 8 pages (2013).
Kuo, M.H., "Automatic extraction of quadric surfaces from wire-frame models," Computers & Graphics, 25:1, Feb. 2001 (Feb. 2001).
Kurazume, R., et al., "Simultaneous 2D images and 3D geometric model registration for texture mapping utilizing reflectance attribute," Presented at the 5th Asian Conference on Computer Vision, Melbourne, Australia, pp. 1-8 (Jan. 23-25, 2002).
Laure, F. et al., "Automatic Texturing without Illumination Artifacts from In-hand Scanning Data Flow," Artifacts Free Automatic Texturing for In-Hand Scanning, pp. 1-13 (2012).
Lavoue, G., et al., "Markov Random Fields for Improving 3D Mesh Analysis and Segmentation," Eurographics Workshop on 3D Object Retrieval (2008).
Lee, Chang H., et al., "Mesh Saliency," Dept. of Computer Science, University of MD, (2005).
Lee, J., et al., "Interactive Retexturing from Unordered Images," 2014 11th International Conference on Ubiquitous Robots and Ambient Intelligence, pp. 18-21 (Nov. 12, 2014).
Lempitsky, V. et al., "Seamless Mosaicing of Image-Based Texture Maps," 6 pages, (2007).

(56) References Cited

OTHER PUBLICATIONS

Lensch, H.P.A. et al., "Automated Texture Registration and Stitching for Real World Models," 13 pages, (2000).
Lévy, B. et al., "Least Squares Conformal Maps for Automatic Texture Atlas Generation," 10 pages (2002).
Lourakis, M.I.A. et al., "SBA: A Software Package for Generic Sparse Bundle Adjustment," ACM Transactions on Mathematical Software, 36(1): pp. 2:1-2:30 (Mar. 2009).
Moslah, O. et al., "Geo-Referencing Uncalibrated Photographs using Aerial Images and 3D Urban Models," 6 pages (Jan. 1, 2009).
Moslah, O. et al., "Urban Models Texturing from Un-Calibrated Photographs," IVCNZ, 23rd International Conference, IEEE, Piscataway, NJ pp. 1-6 (Nov. 26, 2008).
Newcombe, R.A., et al., "KinectFusion: Real-Time Dense Surface Mapping and Tracking.", Mixed and Augemented Reality (ISMAR), 10th IEEEE International Symposium, Oct. 26-29, 2011, 10 pages.
Reisner-Kollmann, I. et al., "Interactive reconstruction of industrial sites using parametric models," Proceedings of the 26th Spring Conference on Computer Graphics, SCCG '10, Jan. 1, 2010, p. 101.
Rocchini, C., et al., "Multiple Textures Stitching and Blending on 3D Objects," Istituto di Elaborazione dell'Informazione, 13 pages (1999).
Štencel, M. and Janáček, J., "On Calculation of Chamfer Distance and Lipschitz Covers in Digital Images," 6 pages (2006).
Surazhsky, T. et al., "A Comparison of Gaussian and Mean Curvatures Estimation Methods on Triangular Meshes," 6 pages, (2003).
Van Den Hengel, A. et al., "Video Trace: Rapid interactive scene modelling from video," ACM Transactions on Graphics, 26(3): 86-1-86-5 (Jul. 29, 2007).
Varady, T. et al, "Reverse Engineering of Geometric Models—An Introduction," Computer-Aided Design, 29(4): 255-268 (Apr. 1, 1997).
Wang, L. et al., "Optimal Texture Map Reconstruction from Multiple Views," Computer Vision and Pattern Recognition, CVPR, 8 pages, (2001).
Wu, H. et al., "Photogrammetric reconstruction of free-form objects with curvilinear structures," Visual Comput, 21(2): 203-216 (May 1, 2005).
Xu, L., et al., "A General Texture Mapping Framework for Image-based 3D Modeling," 2010 Proceedings of 17th IEEE International Conference on Image Processing, (2010), pp. 2713-2716.
Zhang, E. et al., "Feature-Based Surface Parameterization and Texture Mapping," ACM Transactions on Graphics, 24(1): 1-27 (Jan. 2005).
Zhang, Z., "A Flexible New Technique for Camera Calibration," Microsoft Corporation, Technical Report MSR-TR-98-71, 22 pages (Dec. 2, 1998).
Zhou, K. et al., "TextureMontage: Seamless Texturing of Arbitrary Surfaces From Multiple Images," 8 pages (2005).
Chen, T., et al, "3-Sweep: Extracting Editable Objects from a Single Photo," SIGGRAPH Asia, 2013.
Autodesk 123D Catch; "123D Catch is a free app that lets you create 3D scans of virtually any object" www.123dapp.com/catch; retrieved from Internet Jan. 14, 2016.
Wu, C., "VisualSFM: A Visual Structure from Motion System" http://homes.cs.washington.edu/~ccwu/vsfm/; retrieved from Internet Jan. 14, 2016.
Acute3D Capturing Reality; "Capturing reality with automatic 3D photogrammetry software" http://www.acute3d.com; retrieved from Internet Jan. 8, 2016.
Alexandre, L.A., "3D Descriptors for Object and Category Recognition: a Comparative Evaluation," IROS 2012.
Anguelov, D., et al.,"SCAPE: Shape Completion and Animation of People," SIGGRAPH 2005.
Barbie, J., and James, D.L., "Real-Time Subspace Integration for St. Venant-Kirchhoff Deformable Models," SIGGRAPH 2005.
Barron, et al., "Shape, Illumination and Reflectance from Shading," EECS, 2013.
Calakli, F., et al., "SSD: Smooth Signed Distance Surface Reconstruction," Pacific Graphics, vol. 30, No. 7, 2011.
Chen, Y., et al., "Single and Sparse View 3D Reconstruction by Learning Shape Priors," Computer Vision and Image Understanding, Nov. 2, 2011.
Cui, Y., et al., "3D Shape Scanning with a Time-of-Flight Camera," CVPR 2010.
Duncan, K., et al., "Multi-scale Superquadric Fitting for Efficient Shape and Pose Recovery of Unknown Objects," ICRA 2013.
Eitel, A., et al., "Multimodal Deep Learning for Robust RGB-D Object Recognition," International Conference on Intelligent Robots and Systems, 2015.
Eitz, M., et al., "Sketch-Based Shape Retrieval," SIGGRAPH, 2012.
Engel, J., et al., "LSD-SLAM: Large-Scale Direct Monocular SLAM," CVPR 2014.
Faugeras, O., "Three-Dimensional Computer Vision: A Geometric viewpoint," MIT Press 1994.
Frefeld, O. and Black, M.J., "Lie Bodies: A Manifold Representation of 3D Human Shape," ECCV 2012.
Furukawa, Y., et al. "Towards Internet-scale Multi-view Stereo," CVPR 2010.
Hartley, R., et al., "Multiple View Geometry in Computer Vision," Cambridge Univ. Press 2004.
Hildebrandt, K., et al., "Eigenmodes of Surface Energies for Shape Analysis," Advances in Geometric Modeling and Processing 2012.
Newcombe, et al. "KinectFusion: Real-Time Dense Surface Mapping and Tracking," Symposium ISMAR 2011.
Kazhdan, M., et al. "Poisson Surface Reconstruction," Eurographics Symposium on Geometry Processing 2006.
Koutsourakis, P., et al., "Single View Reconstruction Using Shape Grammars for Urban Environments," ICCV 2009.
Li, Y., et al., "Database-Assisted Object Retrieval for Real-Time 3D Reconstruction," Eurographics, 2015.
Mairal, J., "Sparse Modeling for Image and Vision Processing, Foundations and Trends in Computer Graphics and Vision," 2014.
Nelder, J., and Mead, R., "A Simplex Method for Function Minimization," Computer Journal 1965.
Newcombe, R., et al., "Live Dense Reconstruction with a Single Moving Camera," IEEE ICCV 2011.
Prados, et al., "Shape from Shading ," Handbook of Mathematical Models in Computer Vision, 2006.
"Reconstruct your world with ReconstructMe", reconstructme.net; retrieved from Internet Jan. 14, 2016.
Rother, C., et al.,"GrabCut—Interactive Foreground Extraction using Iterated Graph Cuts," SIGGRAPH 2004.
Rusu, R.B., et al., "Fast Point Feature Histograms (FPFH) for 3D Registration," ICRA 2009.
SDK for Kinect, KinectFusion, http://www.microsoft.com retrieved from Internet Jan. 14, 2016.
Sifakis, E.D., "FEM Simulation of 3D Deformable Solids: A Practitioner's Guide to Theory, Discretization and Model Reduction," SIGGRAPH 2012 Course.
Szeliski, R., "Computer Vision: Algorithms and Applications," Edition Springer 2010.
Oswald, M., et al., "Fast and Globally Optimal Single View Reconstruction of Curved Objects," CVPR, 2012.
Tombari, T., et al., "Unique Signatures of Histograms for local Surface Description," ECCV 2010.
Wohlhart, P., and Lepetit, V., "Learning Descriptors for Object Recognition and 3D Pose Estimation," Computer Vision and Pattern Recognition, 2015.
Zheng, et al., "Interactive Images: Cuboid Proxies for Smart Image Segmentation," SIGGRAPH, 2012.
Kolomenkin, M., et al., "On Edge Detection on Surfaces", IEEE, 2009.
Krizhevsky, Alex, Ilya Sutskever, and Geoffrey E. Hinton. "ImageNet Classification with Deep Convolutional Neural Networks." Advances in Neural Information Processing Systems. 2012.
Loper, Matthew M., and Michael J. Black. "OpenDR: An Approximate Differentiable Renderer." European Conference on Computer Vision. Springer International Publishing, 2014.
Chen, Yinpeng, Zicheng Liu, and Zhengyou Zhang. "Tensor-Based Human Body Modeling." Proceedings of the IEEE Conference on Computer Vision and Pattern Recognition. 2013.

(56) References Cited

OTHER PUBLICATIONS

Bălan, Alexandru O., and Michael J. Black. "The Naked Truth: Estimating Body Shape Under Clothing." European Conference on Computer Vision. Springer Berlin Heidelberg, 2008.
Bălan, Alexandru O., et al. "Detailed Human Shape and Pose From Images." 2007 IEEE Conference on Computer Vision and Pattern Recognition. IEEE, (2007).
Guan, Peng, et al. "Estimating Human Shape and Pose From a Single Image." 2009 IEEE 12th International Conference on Computer Vision. IEEE, 2009.
Weiss, Alexander, David Hirshberg, and Michael J. Black. "Home 3D Body Scans From Noisy Image and Range Data." 2011 International Conference on Computer Vision. IEEE, 2011.
Perbet, Frank, et al. "Human Body Shape Estimation Using a Multi-Resolution Manifold Forest." Proceedings of the IEEE Conference on Computer Vision and Pattern Recognition. 2014.
Gschwandtner, M., et al., "BlenSor: Blender Sensor Simulation Toolbox", Advances in Visual Computing: 7th International Symposium, vol. 6939/2011 pp. 199-208, 2011.
Nguyen, C., et al., "Modeling Kinect Sensor Noise for Improved 3D Reconstruction and Tracking", 2012 Second Joint 3DIM/3DPVT Conference: 3D Imaging, Modeling, Processing, Visualization & Transmission, IEEE, 2012.
Chatterjee, A., et al., "Noise in Structured-Light Stereo Depth Cameras: Modeling and its Applications", Dept. Of Engineering, Indian Institute of Science, Bengaluru, May 8, 2015.
Belhedi, A., et al., "Noise Modelling and Uncertainty Propagation for TOF Sensors", International Conference of Computer Vision, 2012.
Zeng, M., et al. "Dynamic Human Surface Reconstruction Using a Single Kinect", 13th International Conference on Computer-Aided Design and Computer Graphics, 2013.
Leizea, I., et al. "Real-time Deformation, Registration and Tracking of Solids Based on Physical Simulation", IEEE International Symposium on Mixed and Augmented Reality, Science and Technology Proceedings, Sep. 10-12, 2014.
Zollhöfer, M., et al. "Real-time Non-rigid Reconstruction using an RGB-D Camera", ACM Transactions on Graphics, vol. 22, No. 4, Article 156, Jul. 2014.
Leizea, I., et al., "Development and Improvement of Optical Tracking Methods towards Registering the Deformations of 3D Non-Rigid Bodies in Real Time for Augmented Reality Applications", Ph.D. Thesis, pp. 1-314, Feb. 2015.
European Search Report for EP 15 30 7199 dated Jun. 17, 2016 entitled "Reconstructing a 3D Modeled Object".
Komodakis, N., et al.,. "Image Completion Using Efficient Belief Propagation via Priority Scheduling and Dynamic Pruning," IEEE Transactions on Image Processing 2007.
Komodakis, N., et al., "MRF Optimization via Dual Decomposition: Message Passing Revisited," IEEE Trans. 2011.
Komodakis, N., "Image Completion Using Global Optimization," CVPR 2006.
Kolmogorov, V. . "Convergent Tree-Reweighted Message Passing for Energy Minimization," Pattern Analysis and Machine Intelligence, IEEE 2006.
Zheng Jian-dong et al., "3D Curve Structure Reconstruction From a Sparse Set of Unordered Images," Computers in Industry 60 (2009).
European Search Report for EP 16 18 8268 dated Feb. 21, 2017.
Handa, A., et al., "A Benchmark for RGB-D Visual Odometry, 3D Reconstruction and SLAM", 2014 IEEE International Conference on Robotics and Automation (ICRA), IEEE, pp. 1524-1531, May 31, 2014.
Handa, A., et al., "Understanding Real World Indoor Scenes with Synthetic Data", 2016 IEEE Conference on Computer Vision and Pattern Recognition (CVPR), IEEE, pp. 4077-4085, Jun. 27, 2016.
Xu, K., et al., "Data-Driven Shape Analysis and Processing" Computer Graphics Forum, pp. 1-27, Feb. 24, 2015.
Shotton, J., et al., "Real-Time Human Pose Recognition in Parts from Single Depth Images", Communications of the ACM, vol. 56, No. 1, Jan. 2013.
Salamati, N., et al. "Incorporating Near-Infrared Information into Semantic Image Segmentation", CORR, Jun. 24, 2014.
Krahenbuhl, P., et al. "Efficient Inference in Fully Connected CRFs with Gaussian Edge Potentials" Computer Science Department, Stanford University, May 12, 2017.
Hoegner, L., et al. "Towards People Detection from Fused Time-of-Flight and Thermal Infrared Images" International Archives of the Photogrammetry, Remote Sensing and Spatial Information Sciences, vol. X1-3, Aug. 11, 2014.
European Search Report for EP 16 30 6860 dated May 19, 2017.
European Search Report for EP 16 30 6838 dated Jul. 20, 2017.
Sahu, T., et al. , "Image Enhancement Based on Abstraction and Neural Network", International Journal of Scientific Engineering and Technology, pp. 2277-1581148. Apr. 2012.
Landau, M., et al., "Simulating Kinect Infrared and Depth Images", IEEE Transactions of Cybernetics, vol. 46, No. 12, pp. 3018-3031; Nov. 13, 2015.
Ley, A., et al., SyB3R: A Realistic Synthetic Benchmark for 3D Reconstruction from Images, Network and Parallel Computing, pp. 23-251, Sep. 16, 2016.
Komodakis, N., et al. . "MRF optimization via dual decomposition: Message-passing revisited." Computer Vision, IEEE 11th International Conference 2007.
Sculpteo, "MeshMixer Tutorial Part1: Modeling for 3D Printing", https://youtube.com/watch?v=WwIM4FP2SgA, retrieved from Internet Sep. 13, 2017.

* cited by examiner

3D RECONSTRUCTION OF A REAL OBJECT FROM A DEPTH MAP

RELATED APPLICATION(S)

This application claims priority under 35 U.S.C. § 119 or 365 to Europe, Application No. 16188268.3, filed Sep. 12, 2016. The entire teachings of the above application(s) are incorporated herein by reference.

FIELD OF THE INVENTION

The invention relates to the field of computer programs and systems, and more specifically to methods, systems and programs related to the reconstruction of a 3D modeled object that represents a real object, such as a human body, from a depth map.

BACKGROUND

A number of systems and programs are offered on the market for the design, the engineering and the manufacturing of objects. CAD is an acronym for Computer-Aided Design, e.g. it relates to software solutions for designing an object. CAE is an acronym for Computer-Aided Engineering, e.g. it relates to software solutions for simulating the physical behavior of a future product. CAM is an acronym for Computer-Aided Manufacturing, e.g. it relates to software solutions for defining manufacturing processes and operations. In such computer-aided design systems, the graphical user interface plays an important role as regards the efficiency of the technique. These techniques may be embedded within Product Lifecycle Management (PLM) systems. PLM refers to a business strategy that helps companies to share product data, apply common processes, and leverage corporate knowledge for the development of products from conception to the end of their life, across the concept of extended enterprise. The PLM solutions provided by Dassault Systèmes (under the trademarks CATIA, ENOVIA and DELMIA) provide an Engineering Hub, which organizes product engineering knowledge, a Manufacturing Hub, which manages manufacturing engineering knowledge, and an Enterprise Hub which enables enterprise integrations and connections into both the Engineering and Manufacturing Hubs. All together the system delivers an open object model linking products, processes, resources to enable dynamic, knowledge-based product creation and decision support that drives optimized product definition, manufacturing preparation, production and service.

In this framework, the field of computer vision and computer graphics offers technologies which are more and more useful. Indeed, this field has applications to 3D reconstruction. 3D reconstruction can be used in any field which involves the creation of (e.g. textured) 3D models, such as serious gaming, video games, architecture, archeology, reverse engineering, 3D asset database, or virtual environments. Several academic and industrial players now offer software solutions for 3D reconstruction, for example by RGB and/or depth image analysis, such as Acute 3D, Autodesk, VisualSFM, or by RGB-Depth analysis, such as ReconstructMe or Microsoft's SDK for Kinect (registered trademarks).

RGB-Depth (or RGB-D) image analysis is an approach to 3D reconstruction that uses "emitter-receiver" sensors which provide depth data in addition to standard RGB data. Depth data may constitute the data mainly used in the reconstruction process. The following papers relate to this approach: "Yan Cui et al.: *3D Shape Scanning with a Time-of-Flight Camera*, CVPR 2010", "R S. Izadi et al.: *KinectFusion: Real-Time Dense Surface Mapping and Tracking*, Symposium ISMAR 2011", and "R. Newcombe et al.: *Live Dense Reconstruction with a Single Moving Camera*, IEEE ICCV2011". Depth-map analysis reconstruction methods are based on disparity maps or approximated 3D point clouds. Those disparity maps are obtained using stereovision or structured light (see the 'Kinect' device for example) or 'Time of Flight' 3D-cameras.

RGB-D image analysis may notably be used in a process of 3D reconstruction of a real object, such as a human body. Starting from an RGB-D acquisition of a user (i.e. color image with a depth map image), the aim of such a process is to predict the exact 3D shape and/or pose of the user's body. This has many applications in virtual try-on simulation, augmented reality, internet of things and video games, where the user's body shape and pose are captured e.g. with a single RGB-D sensor.

Most of the 3D human body reconstruction literature can be summarized into a single class of methods that can be referred to as "optimization-based methods". These methods estimate the 3D human body parameters, pose and shape, using optimization technics applied to a cost function that compares a view of the user to a 3D parametric body model.

The following lists papers that disclose examples of optimization-based methods:

Balan, L. S. *Detailed Human Shape and Pose from Images*. CVPR, 2007.
Balan, M. B. *The Naked Truth: Estimating Body Shape Under Clothing*. ECCV, 2008.
A. Weiss, D. H. *Home 3D body scans from noisy image and range data*. ICCV, 2011.
F. Perbet, S. J. *Human Body Shape Estimation Using Multi-Resolution Manifold Forest*. CVPR, 2014.
M. Loper, M. B. *OpenDR: An approximate Differentiable Renderer*. ECCV, 201.4
P. Guan, A. W. *Estimating human shape and pose from a single image*. ICCV, 2009.
Y. Chen, Z. L. *Tensor-based Human Body Modeling*. CVPR, 2013.

As stated in these papers, optimization-based methods start by capturing the user using an RGB-D camera. This delivers an RGB image and a depth map image. The method then represents the 3D human body with a parametric model controlled by shape and pose parameters. The shape parameters capture the intrinsic shape across people while the pose parameters capture the body pose.

Using this parametric model with the user RGB-D acquisition, optimization-based methods often predict the model parameters using two optimization steps.

The first step consists in searching for the body parameters (shape and pose) by matching the parametric body model's silhouette to the observed one (extracted from the user depth map).

The two silhouettes are compared using a bidirectional cost, defined for example:

$$E_{silhouette} = d(S \rightarrow T) + d(T \rightarrow S)$$

$$d(S \rightarrow T) = \frac{\sum_{i,j} S_{ij} \cdot C_{ij}(T)}{\sum_{i,j} S_{ij}}$$

Where S is the user silhouette and T is the model silhouette and:

S$_{ij}$=1 if the pixel of index (i, j) is inside S, otherwise 0.
C$_{ij}$(T)=distance of a pixel (i, j) to the nearest pixel in S if pixel (i, j) not in T, otherwise 0.

The second step consists in matching both the body parameters and the observed depth map by minimizing a cost function of both maps. The cost function is defined as the distance between the overlapped two depth maps, as defined below:

$$E_{depth} = \frac{1}{N} \sum_{pixels} \rho(D_S - D_T)$$

Where D$_S$ is the user depth map, D$_T$ is the model depth map, ρ is the Geman-McClure estimator and N is the number of overlapped pixels.

Another optimization-based method is proposed by above-cited "F. Perbet, S. J. *Human Body Shape Estimation Using Multi-Resolution Manifold Forest*. CVPR, 2014". This method searches only the shape parameters and formulates the task of shape estimation as of optimizing an energy function over the manifold of human body shapes. Starting from a single human depth map, an initial solution is found on the manifold using a similarity measure. An Iterative Closest Point is then used to refine the solution.

3D human body reconstruction using optimization-based reconstruction methods suffer from different drawbacks. One relates to the low convergence speed. For example, as stated in above-cited "A. Weiss, D. H. *Home 3D body scans from noisy image and range data*. ICCV, 2011", the method may take more than forty-five minutes to converge. This is due to the large number of unknowns and the complexity of the objective function (which is not differentiable for most cases). Also, optimization methods can be stuck into a local minimum, because the optimization objective function employed is not convex. A common strategy to bypass the local minimum problem is to alternate the optimization between pose and shape parameters, by splitting the optimization to several optimization problems with different unknowns for each one. This is proposed notably by above-cited "Balan, M. B. *The Naked Truth: Estimating Body Shape Under Clothing*. ECCV, 2008". This avoids optimizing a large vector of unknowns and helps the convergence, but it still takes an important time and the convergence is not guaranteed.

Within this context, there is still a need for an improved solution for reconstructing a 3D modeled object that represents a real object from a depth map.

SUMMARY OF THE INVENTION

It is therefore provided a computer-implemented method for learning a function configured for reconstructing, for a class of real objects, a 3D modeled object that represents an instance of the class from a depth map of the instance. The method may be referred to as the "learning method" or "offline" mode or method.

The learning method comprises providing a parametric model of the class. The learning method also comprises creating a database. The creation of the parametric model includes varying parameters of the parametric model to generate 3D modeled objects that each represent a respective instance of the class. The creation of the database also includes synthetizing, for each generated 3D modeled object, a respective depth map of the respective state of the instance represented by the generated 3D modeled object. The creation of the database also includes associating each synthetized depth map to a corresponding 3D modeled object. The learning method also comprises learning the function with the database.

In examples, the learning method may comprise one or more of the following:
  synthetizing a respective depth map for each generated 3D modeled object includes providing a virtual viewpoint, and determining a theoretic depth map that represents exact depth from the virtual viewpoint to the generated 3D modeled object;
  synthetizing a respective depth map for each generated 3D modeled object further includes adding a perturbation to the theoretic depth map at least at locations that correspond to contours of the respective generated 3D modeled object;
  adding a perturbation includes adding a random noise to the depth map;
  the random noise is a Gaussian noise;
  the random noise corresponds to the noise of a depth sensor;
  the depth sensor is the same or of the same type as the depth sensor involved in the later-discussed reconstruction method and/or in the later-discussed system;
  the class of real objects is a class of human bodies; and/or
  the function learnt by the learning method is then outputted, for example stored on memory—e.g. non-volatile memory—and/or sent to a distant system such as the later-discussed system—e.g. the learning method being performed by another device.

It is further provided a function learnable according to the learning method, that is, a data structure corresponding to the function outputted by the learning method. In an example, the function is effectively learnt according to the learning method. The function may be referred to as "the reconstruction function".

It is further provided a method for reconstructing, for a class of real objects, a 3D modeled object that represents an instance of the class from a depth map of the instance. Such a method may be referred to as "reconstruction method" or "online" mode or method.

The reconstruction method comprises providing the reconstruction function. The reconstruction method also comprises providing a depth map. The reconstruction method also comprises applying the reconstruction function to the depth map. In examples, the depth map may be acquired by a depth sensor.

It is further provided a 3D modeled object obtainable by the reconstruction method, that is, a data structure corresponding to the 3D modeled object outputted by the reconstruction method. The 3D modeled object may be referred to as the "reconstructed 3D modeled object".

It is further provided a computer program comprising instructions for performing the learning method and/or the reconstruction method.

It is further provided a computer readable storage medium, that is, a memory, having recorded thereon any one or combination of the above-discussed data structures, that is, the reconstructed 3D modeled object, the reconstruction function, and/or the computer program.

It is further provided a system comprising a processor coupled to the computer readable storage medium or memory. In examples, the system may further comprises a depth sensor.

BRIEF DESCRIPTION OF THE DRAWINGS

The foregoing will be apparent from the following more particular description of example embodiments, as illustrated in the accompanying drawings in which like reference characters refer to the same parts throughout the different views. The drawings are not necessarily to scale, emphasis instead being placed upon illustrating embodiments.

Embodiments of the invention will now be described, by way of non-limiting example, and in reference to the accompanying drawings, where.

DETAILED DESCRIPTION OF THE INVENTION

Figure 1:
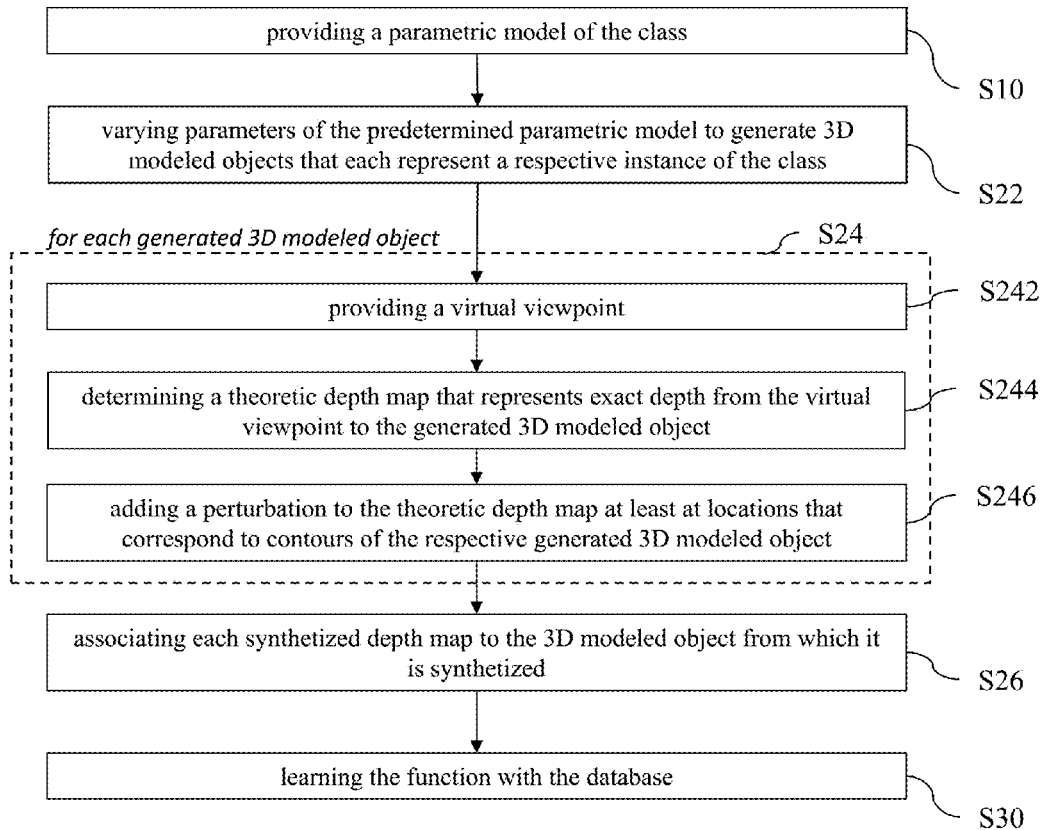
FIG. 1 shows a flowchart of an example of the learning method.

A description of example embodiments follows.

The teachings of all patents, published applications and references cited herein are incorporated by reference in their entirety.

The provided methods, programs, mediums and systems improve the reconstruction of a 3D modeled object that represents an instance of a class of real objects from a depth map of the instance real object, notably by implementing the machine-learning paradigm in such a context and thereby achieving advantages thereof.

The reconstruction method allows obtaining the 3D modeled object from a relatively simple data structure representing the instance, that is, the depth map of the instance. In examples the reconstruction method may be executed based on a single depth map of the instance. The depth map may be obtained by a process that comprises or consists of acquiring depth measurements with a depth sensor. Thus, the reconstruction method may be performed very easily, by simply acquiring a depth map of the instance, for example a single depth map, e.g. with any device or system that comprises a depth sensor, such as an RGB-D camera. The reconstruction method may then comprise applying the reconstruction function to directly output the 3D modeled object, with a computational complexity dependent on the size of the depth map only, as the reconstruction function applies directly to the depth map. The reconstruction method is thus relatively fast and achieves real-time performance. This opens up many consumer-oriented applications.

Also, in examples the reconstruction method may be executed based on a depth map of the instance in any pose. In other words, for the depth data acquisition prior to the 3D reconstruction of the instance may take any pose. The 3D reconstruction thus provides for free-posing at the time of depth acquisition. Thanks to the reconstruction function taking into account posing variability, the reconstruction method does not require a reference pose to be taken when acquiring depth data. This increases flexibility when performing the reconstruction method.

This is all thanks to the way the reconstruction function is obtained, in other words, to the specificities of the learning method. In particular the reconstruction function is learnt (i.e. obtained by machine-learning) on a database created appropriately so that the machine-learning can lead to a relevant result. A pre-existing database appropriate for such learning is not available (e.g. unlike in the context of a machine-learning of a function to recognize, for example, a cat in an image, where images available on the internet can simply be retrieved and indexed appropriately to form the learning database). Therefore, the learning method creates/synthetizes such an ad hoc learning database, by making use of a parametric model of the class. The machine-learning process to obtain the reconstruction function (i.e. the learning method) can then run on the created database. In specific, the creation of the database leads to depth maps each associated to a corresponding 3D modeled object. The learning method can thus learn a reconstruction function that reconstructs a 3D modeled object from a depth map, based on such a database and its specific "3D modeled object—depth map" data association.

General examples of the methods and systems are now discussed with reference to FIGS. 1-3.

FIG. 1 shows an example of the offline learning method.

The method of FIG. 1 leads to a function configured for reconstructing a 3D modeled object from a depth map, at least for a (i.e. at least one) class of real objects. Thus, the reconstruction function obtained by the learning method is such that the reconstruction method can later apply to each real object of such a class. The learning method outputs a data structure that represents how a function that takes a depth map as an argument processes such argument. The data structure can thus be used to perform such processing. The learning is such that when the reconstruction function is applied any time to a depth map that represents an instance of the class, the reconstruction leads to a 3D modeled object representing said instance relatively accurately (i.e. relatively close—in terms of geometry—to the real morphology of the instance). The function can also apply to depth maps representing a real object out of the class or abstract depth maps (i.e. not representing any real object), and for example lead to the 3D modeled object representing an instance of the class corresponding to reconstruction from the nearest depth map to the abstract depth map. Alternatively, the function can be restricted so as to output an error or a null in such a case. This is however merely a matter of implementation, and thus not further discussed in the following.

The learning method of FIG. 1 comprises providing at S10 a (i.e. at least one) parametric model of the class of real objects. This data structure is now discussed in details, although widely known.

The expression "class of real objects" designates a collection, group or category of real objects that have a similar morphology. The term "morphology" designates the 3D shape of a real object regardless of its pose. In other words, the morphology of a real object is the distribution of 3D shapes achievable by the real object with respect to all possible poses it can take. The pose of a real object corresponds to how the real object stands with respect to internal deformation degrees of freedom if any (the pose being, in case the real object has no internal deformation degree of freedom at all, the unique 3D shape the real object can present). In other words, the pose of a real object corresponds to a particular configuration of its internal deformation degrees of freedom. The internal degrees of freedom can correspond to deformable portions of the real object between block members of the real object (i.e. portions of the real object not to be deformed). The deformable portions can form articulations. Articulations may allow rotation between two block members, be twistable and/or (e.g. slightly) stretchable.

An element of the class is called "instance". An instance is thus a real object of the class. An instance has a 3D shape—that depends on its pose if any. An instance may be represented by a 3D modeled object that models such 3D shape of the instance. Notably, at the varying S22, 3D modeled objects that each represent a respective instance of the class are generated. A 3D modeled object may represent an instance in a given pose. For example, the 3D modeled object outputted by the reconstruction method may represent the instance (whose depth map is provided for the reconstruction) in the pose of the instance as represented by the depth map. This is however not necessarily the case, depending on how the varying S22 and the synthetizing S24 are performed, notably in view of the application contemplated for the method. This is discussed in more details later, when discussing the varying S22 and the synthetizing S24.

The class of real objects is a collection of real objects which can be represented this way by such 3D modeled objects (each representative of a respective pose of the real object it models). Each such 3D modeled objects corresponds to parameter values of a same parametric model. The class may thus be defined by such a representative parametric model. The parametric model is common to all real objects of the class and thereby represents the class. In other words, a class of real objects is a collection of real objects which can be gathered by the fact that their respective 3D shapes share a same parametric model. The parametric model can thus be used to obtain different 3D shapes (corresponding to different parameter values) that each represent a respective instance of the class in a respective pose, that is, a respective real object that has the outputted 3D shape in said respective pose. Such a parametric model is provided at S10 for such purposes. It is noted that the class of real objects can be represented by different parametric models, that is, by models having a different data structure and/or a different mathematical expression but yet lead to the same class of morphologies and are thus equivalent in such respect. The learning method can provide at S10 and then process one or several such parametric models. Also the learning method can apply for a single class of real objects or for several classes of real objects (a respective parametric model being provided at S10 for each class). The following discussions relate to the case of a single class contemplated by the method and a single parametric model provided at S10. Adaptation to the multiple cases is straightforward.

The parametric model may thus be a function that outputs, based on input parameters, a data structure from which a 3D modeled object can be derived (e.g. directly a 3D modeled object). A set of values for of the parameters of the parametric model thus represent a 3D modeled object (one value per each parameter). The image of the parametric model (i.e. the set of values outputted by applying the parametric model over all its domain) represents 3D shapes of respective instances of the class of real objects in respective poses. The parameters may be divided into two distinct categories: shape parameters and pose parameters. Shape parameters control selection of the real object among the class whereas pose parameters control the pose of a selected real object. The complexity of the parametric model and notably the number of parameters involved depends on the complexity of the morphology of the real objects in the class and on the ratio between the fineness and the synthetization requirements to model the class and/or the poses (in other words, the level of discrimination wanted to model the class and/or the poses). This number can generally be inferior to 100, or yet 75. For example, for the class of human bodies mentioned later, the parametric model provided at S10 may involve more than 5 and/or less than 15 (e.g. of the order of 10) parameters to represent the instance selection, and/or more that 20 or 30 and/or less than 60 or 45 parameters to represent the pose of the selected instance. The parametric model may be continuous over the parametric domain. Each domain of a parameter can be a range of real numbers, bounded or not. Each parameter may control—e.g. continuously—a type of deformation or homeomorphism.

For example, a parametric model of a class of real objects can be determined from a sample of 3D shapes of instances of the class in respective poses (e.g. more than 1000) by a principal component analysis (PCA), as known per se. The 3D shapes may be modeled in any way, for example retrieved from a database or manually designed. The parametric model then describes any shape of an instance of the class as a sum of the principal components outputted by such PCA, weighted by parameters values. The learning method may comprise a prior step of such determination of the parametric model, or alternatively the parametric model may be predetermined and simply retrieved to be provided at S10.

The notion of a "parametric model" is known as such from the prior art, and notably from earlier-cited prior art optimization-based methods. Indeed, in such methods the optimization process often searches for optimal parameters of a parametric model of a class of real objects. The parametric model provided at S10 may be such a parametric model disclosed in such prior art. The paper "A. Weiss, D. H. Home 3D *body scans from noisy image and range data*. ICCV, 2011" notably provides a detailed description of a parametric model for a class of human bodies.

In examples, the output of the parametric model may be a 3D triangulated mesh structure which is defined as a set of vertices (3D points) and the corresponding connections over this set of points which defines the triangles of the mesh. This 3D mesh is modeled as a deformation of a reference mesh. The deformation is on the level of the triangle's edges. It is defined as:

$$e_{k,j} = D_k(w,\beta)\bar{e}_{k,j}$$

$$D_k = R_{p(k)}(w) S_k(\beta) Q_k(w)$$

$$\bar{e}_{k,j} = x_{k,j} - x_{k,0}$$

$$j=1,2$$

$$k=1,\ldots,n_T$$

$$X = M^{-1} E$$

Where $e_{k,j}$ is the $j^{th}$ edge of the $k^{th}$ triangle in the transformed mesh, this is a vector of size (3×1). $\bar{e}_{k,j}$ is the corresponding one in the reference mesh. $x_{k,j}$ of size (3×1) is the $j^{th}$ vertex in the $k^{th}$ mesh triangle. $n_T$ is the number of triangles in the 3D human body output mesh. $D_k$ is the deformation matrix of size (3×3).

In examples, this matrix may be factorized into:
1. A rigid transformation pose matrix $R_{p(k)}$ of size (3×3) which is the rotation e.g. of the rigid body part p(k) where the triangle k belongs. This matrix is a function of the pose parameters w. The pose parameters w are the local rotations of the body joints.
2. A non-rigid deformation pose matrix $Q_k$ of size (3×3) which acts as a correction deformation matrix, e.g. especially on the deformed triangles of the joints area and muscles area. Each $Q_k$ matrix is modeled as a linear regression between the two nearest triangle joints local rotations (6 parameters) and the 9 matrix values of $Q_k$.
3. A shape deformation matrix $S_k$ of size (3×3) which is a function of the shape parameters β. This matrix may model the inter-person morphology variation and is responsible of deforming the body shape independently of its pose. The stacked matrices $S_k$ over all the mesh triangles is modeled as a principal component analysis over a database of body shapes:

$$S(\beta) = S_0 + \sum_l \beta_l S_l$$

Where S is a matrix of size ($9 \times n_T$), $S_0$ is the mean body shape and $S_l$ is the $l^{th}$ principal component.

E is the edge matrix (stacked $e_{k,j}$ for all the triangles) of size ($n_E \times 3$), X is the output of the body model which is the matrix of body vertices of size ($n_v \times 3$) and finally M is of size ($n_E \times n_v$).

The class of real objects may be any class for which 3D reconstruction proves useful. The method is particularly useful for classes of real objects that can take different poses, that is, real objects that have at least one internal degree of freedom. Indeed, the free-form acquisition of depth data allowed by the method is particularly useful in such a case. This holds true notably when the class of real objects is a class of human bodies. Furthermore, research on 3D reconstruction from depth data has mainly focused on such a class of real objects, notably because of promising applications, for example in virtual try-on simulation, augmented reality, internet of things and video games, where the user's body shape and pose are captured e.g. with a single RGB-D sensor.

However, the class may gather any other types of real objects, including animals, body organ parts or plants/trees, or yet products such as (e.g. mechanical) parts or assemblies of parts or more generally any rigid body assembly (e.g. a mobile mechanism). The products may be used in various and unlimited industrial fields, including: aerospace, architecture, construction, consumer goods, high-tech devices, industrial equipment, transportation, marine, and/or offshore oil/gas production or transportation. The method may contemplate an industrial product which may be any mechanical part, such as a part of a terrestrial vehicle (including e.g. car and light truck equipment, racing cars, motorcycles, truck and motor equipment, trucks and buses, trains), a part of an aerial vehicle (including e.g. airframe equipment, aerospace equipment, propulsion equipment, defense products, airline equipment, space equipment), a part of a naval vehicle (including e.g. navy equipment, commercial ships, offshore equipment, yachts and workboats, marine equipment), a general mechanical part (including e.g. industrial manufacturing machinery, heavy mobile machinery or equipment, installed equipment, industrial equipment product, fabricated metal product, tire manufacturing product), an electro-mechanical or electronic part (including e.g. consumer electronics, security and/or control and/or instrumentation products, computing and communication equipment, semi-conductors, medical devices and equipment), a consumer good (including e.g. furniture, home and garden products, leisure goods, fashion products, hard goods retailers' products, soft goods retailers' products), a packaging (including e.g. food and beverage and tobacco, beauty and personal care, household product packaging).

Other steps of the learning method of FIG. 1 are now discussed.

The learning method comprises creating a database based on the parametric model. The database can then be used for machine-learning and can therefore be referred to as "learning database". As known per se from the field of machine-learning, such a learning database may comprise a training database (for determining at S30 a candidate reconstruction function) and a testing database (for evaluating at S30 if the candidate reconstruction function performs well). The training database may comprise more data pieces than the testing database, for example more than 60% of the total number of data pieces (e.g. of the order of 80%). The total number of data pieces depends on the contemplated quality of the learning and on the discrimination power of depth maps for the specific class of real objects contemplated. This number can be higher than 1.000, 10.000, 50.000 or yet 100.000 (e.g. of the order of 40.000 for a very fast learning or of the order of 120.000 for a very accurate learning).

The creation of the database includes varying S22 parameters of the parametric model to generate 3D modeled objects that each represent a respective instance of the class. In other words, the method determines at S22 3D modeled objects that each represent a respective instance of the class (in a respective pose) by making use of the parametric model, that is by determining the result of evaluating the parametric model with specific parameter values. The varying S22 thus achieves a sampling of the parametric domain of the parametric model. The parameter values can be varied at S22 in any way. The 3D modeled objects generated at S22 may represent different instances of the class. For at least part of the instances of the class, a same instance may be represented by strictly more than one 3D modeled object generated at S22 (e.g. representing different poses of the instance). Alternatively each instance of the class may be represented by at most one generated 3D modeled object (thus at most one pose is provided for all instances). The generated 3D modeled objects may represent instances in the same pose (across instances) or alternatively in different poses. In examples, the varying includes a level of regularity and/or a level of randomness in the sampling of the parametric domain. In examples, the sampling may be uniformly applied on each model parameter constrained with the parameter's min and max values. The min/max values are those who still give a plausible body shape.

The learning method also comprises synthesizing S24, for each generated 3D modeled object, a respective depth map of the respective instance represented by the generated 3D modeled object. In other words, the learning method artificially (e.g. and automatically) constructs at S24 for each generated 3D modeled object a depth map that represents the depth map that would be obtained if measuring depth of the instance represented by the 3D modeled object. This is done computationally, that is, with no measurements. This allows then building a reconstruction function by learning a posteriori a function that transforms a depth map in a corresponding 3D modeled object and thereby allows to model the instance of the class represented by the depth map.

For that, the learning method creates the database by associating S26 each synthetized depth map to a corresponding 3D modeled object. As represented on FIG. 1, the corresponding 3D modeled object associated to a given depth map at S26 may be the 3D modeled object generated at S22 from which the given depth map was synthetized at S24. This allows learning a reconstruction function that will reconstruct a 3D modeled object not only representative of the instance but also representative of the pose of the instance when the depth map is measured during the reconstruction method. But this is not necessarily the case. Indeed, in examples at S26 a synthetized depth map may be associated to any 3D modeled object representative of such instance, not necessarily in the correct pose. This depends on whether the application of the method is to reconstruct the instance only (and not the pose) or to also reconstruct the pose. In any case, as known per se from the field of machine-learning, the association performed at S26 conditions what will be learnt at S30, and thus the way S26 is performed precisely depends on the aim of the reconstruction function.

Once the database is created, the learning method learns at S30 the reconstruction function based on the database. The learning S30 is performed classically with any machine-learning scheme, as known per se from the field of machine-learning. The way the learning S30 is performed closely relates to the structure contemplated for the reconstruction function to be learnt. For example, the reconstruction function may include a regression function and the machine learning a regression learning. Notably, the reconstruction function may include application of a neural network. The neural network may implement processing layers (e.g. more than 2), e.g. including layers that apply a linear operation followed by a pointwise non-linearity, such as convolution layers and/or max-pooling layers (e.g. in an alternation). The neural network may for example be a Deep Convolutional Neural Network (CNN). The reconstruction function may also include a pre-processing of the initial (raw) depth map before the above processing(s). The pre-processing may comprise or consist in enriching the raw depth map and/or deriving from the raw depth map another representation of the instance. The pre-processing may comprise or consist in an initial feature extraction, for example an initial hand-crafted feature extraction (e.g. based on a computed or computing a normal map). Alternatively, the method may directly perform the above processing(s) in the initial (raw) depth map (in other words, the method may be deprived from any such pre-processing). Other types of machine-learning from the created database can however be implemented, such as linear and non-linear regression algorithms (e.g. kernel-based).

The synthetizing S24 of a respective depth map for each generated 3D modeled object is now discussed in more details.

The synthetizing S24 can be performed in any way, depending on how one wants to train the reconstruction function. An efficient and simple example of S24 represented on FIG. 1 includes providing S242 a virtual viewpoint, and determining S244 a theoretic depth map that represents exact depth from the virtual viewpoint to the generated 3D modeled object. In other words, for each 3D modeled object generated at S22, an exact theoretic depth map is computed based on a theoretic viewpoint provided in a reference frame associated to the generated 3D modeled object, e.g. using simple geometry calculations, for example consisting of the application of a perspective projection from the theoretic viewpoint. The viewpoint may be the same or present one or several (e.g. all) spherical coordinates—with respect to a spherical reference frame associated to the generated 3D modeled object—that are different across iterations of S242 (i.e. across different 3D modeled objects). The polar angle and the azimuth angle may be fixed (e.g. the variability across such angles being provided directly by parameters of the parametric model). The radius may in examples be fixed or bounded (e.g. if the hardware used in the reconstruction method provides only one measurement spot for the positioning of the instance).

The synthetizing S24 of the example of FIG. 1 also includes adding S246 a perturbation to the theoretic depth map obtained at S44. The perturbation is added at least at locations of the theoretic map that correspond to contours of the generated 3D modeled object. The contours of the generated 3D modeled object correspond of discontinuity of the depth (e.g. passage from the instance to the background and/or from a protuberance to a back portion). Locations that correspond to contours may designate the contours themselves or a strip surrounding the contours having a width below a predetermined threshold, for example a few pixels). In other words, the theoretic map (i.e. obtained by a perspective projection from the virtual viewpoint) is modified at S246 at least at contours of the generated 3D modeled object. The perturbation is any type of modification of the depth data at such contours that decrease the regularity of the contour. This greatly improves the learning and leads to a more accurate reconstruction function.

Indeed, machine learning from 2D images such as depth maps usually leads to giving high weight to very distinctive features in the 2D images. The theoretic calculations of the synthetizing S24 lead to theoretic depth maps that present such distinctive features, including notably contours of the generated 3D modeled object. If used as such for the training, the theoretic depth maps would lead to a reconstruction function that deeply relies on finding such clean contours. However, in a real depth measurement, contours are not so clean, not only because contours of real objects are never perfectly regular (which lack of regularity is usually not captured by the parametric model), but also and more importantly because depth sensors only provide noisy measurements. The addition of a perturbation at S246 breaks a regularity that is unwanted (that is, the too high "cleanness" the of contours in the theoretic depth maps). Such regularity would indeed weaken the training when learning the reconstruction function and thereby lead to a less useful reconstruction function.

The addition S246 may include adding a random noise to the depth map. The random noise may be a random variable that applies to a whole theoretic depth map, and that is particularly expressive at contours of the generated 3D modeled object in the theoretic depth map. The random noise may be a Gaussian noise.

In examples, the addition of the random noise may correspond mathematically to:

$$I_{ij} = I_{ij} + \frac{\nabla I_{ij}}{\nabla I_{max}} * \mathcal{N}_{ij}$$

Where $I_{ij}$ is the i×j pixel location depth value in the depth image, $$\frac{\nabla I_{ij}}{\nabla I_{max}}$$

is the normalized depth image gradient value at pixel location i×j, and $\mathcal{N}_{ij}$ is a real number sampled from a Gaussian distribution with mean 0 and variance between 1 and 5 cm.

A particularly efficient learning method is to add at S246 to the theoretic depth maps outputted at S244 a random noise that corresponds to the noise of a depth sensor. Depth sensors are widely studies, and the characteristics of the noise they present are or can be known. The learning method may notably be coupled to a reconstruction method that contemplates the use of a system with a specific depth sensor. In such a case, the noise of depth sensors of the type of such specific depth sensor, or yet the specific noise of said specific depth sensor may be modeled as a random Gaussian noise and added at S246 during the learning. This leads to a particularly accurate reconstruction function.

Figure 2:
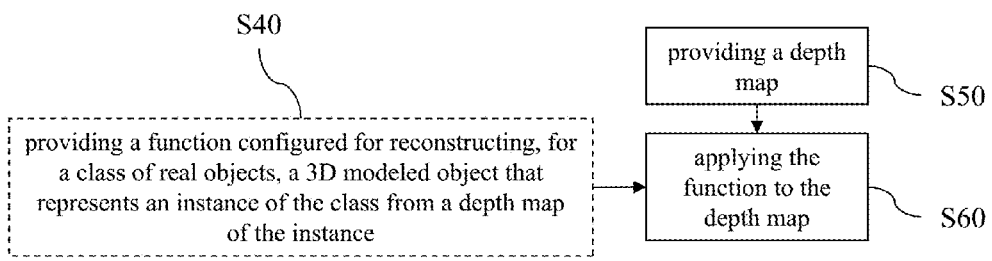
FIG. 2 shows a flowchart of an example of the reconstruction method.

FIG. 2 shows an example of the online (or "inline") reconstruction method. Such a method makes use of the reconstruction function (e.g. as a predetermined piece of data) to reconstruct a 3D modeled object that represents an instance of the class from a depth map of the instance.

The reconstruction method thus comprises providing S40 the reconstruction function, obtained via the method of FIG. 1 for example. The reconstruction function may be stored on the memory and thus available anytime.

The reconstruction method also comprises providing S50 a depth map. The depth map provided at S50 represents the instance whose representative 3D modeled object is to be reconstructed. The depth map is for example acquired by measurements performed by a depth sensor on the instance in a given pose. The acquisition may consist in a single depth image caption. This makes the acquisition fast and simple. The instance may take a free pose during the acquisition. This makes the acquisition flexible.

The reconstruction method then comprises applying S60 the reconstruction function to the depth map. The application S60 of the reconstruction function is fast and leads to an accurate result. In other words, the 3D modeled object obtained from the reconstruction is an accurate representation of the instance whose depth map is provided at S50. This is particularly true when the learning method considered the noise in the measurements of a depth sensor (at earlier-discussed step S246).

The reconstruction function is a machine-learnt function and thus its application S60 is relatively fast compared to running an optimization-based method, and it is relatively robust as it does not suffer from the risk of falling in a local minimum. The application of the reconstruction function may indeed be faster or of the order of 1 second. In the case of a CNN regression learning method, the application S60 of the reconstruction function may notably comprise or consist of a series of convolutional layers and then a dot product. In examples, the application S60 of the reconstruction function may notably comprise or consist of a series of:

1. Consecutive convolutional layers of a total complexity of $\mathcal{O}(\Sigma_{l=1}^{d} n_{l-1} \cdot s_l^2 \cdot n_l \cdot m_l^2)$. Here l is the index of a convolutional layer, d is the neural network depth (number of convolutional layers), $n_l$ is the number of filters in the $l^{th}$ layer, $s_l$ is the spatial size of the filter and finally $m_l$ is the spatial size of the output feature map.

2. Dot product between the output of the last convolution layer and the learned fully connected layer. The last convolution layer is of size $W_d \times W_d \times n_d$. With:

$$W_d = W_0 - \sum_{l=1}^{d} s_l + d$$

where $W_0$ is the width, and also the height, of the input depth image.

The learned fully connected layer parameters of the CNN is of size $d_{fc}$, this layer will contain the model parameters we are looking for. This dot product is of complexity $\mathcal{O}(W_d^2 \cdot n_d \cdot d_{fc})$.

In overall, the complexity of this approach is $\mathcal{O}(\Sigma_{l=1}^{d} n_{l-1} \cdot s_l^2 \cdot n_l \cdot m_l^2 + W_d^2 \cdot n_d \cdot d_{fc})$.

As an example, one may consider the case of the following parameters:

$d=5, d_{fc}=10, W_0=300$ $n_0=1, n_1=96, n_2=256, n_3=384, n_4=384, n_5=256$ $s_1=11, s_2=5, s_3=3, s_4=3, s_5=3$ $m_1=73, m_2=36, m_3=17, m_4=17, m_5=36$

In this example, the complexity is of the order $8*10^6$ operations. Existing optimization-based algorithms may on the contrary consume of the order $3*10^{11}$ operations on the same example.

The reconstructed 3D modeled object may be used as such in earlier-mentioned applications. Alternatively, the reconstructed 3D modeled object may be used as initialization data in an optimization-based algorithm. The reconstructed 3D modeled object being a good starting point, the optimization-based algorithm may converge faster. Also, the optimization-based algorithm may be restricted to pose optimization (i.e. the shape parameters of the reconstructed 3D modeled object being thus fixed).

A modeled object is any object defined by data stored e.g. in the database. By extension, the expression "modeled object" designates the data itself. According to the type of the system at use, the modeled objects may be defined by different kinds of data. The system may indeed be any combination of a CAD system, a CAE system, a CAM system, a PDM system and/or a PLM system. In those different systems, modeled objects are defined by corresponding data. One may accordingly speak of CAD object, PLM object, PDM object, CAE object, CAM object, CAD data, PLM data, PDM data, CAM data, CAE data. However, these systems are not exclusive one of the other, as a modeled object may be defined by data corresponding to any combination of these systems. A system may thus well be both a CAD and PLM system, as will be apparent from the definitions of such systems provided below.

By CAD system, it is additionally meant any system adapted at least for designing a modeled object on the basis of a graphical representation of the modeled object, such as CATIA. In this case, the data defining a modeled object comprise data allowing the representation of the modeled object. A CAD system may for example provide a representation of CAD modeled objects using edges or lines, in certain cases with faces or surfaces. Lines, edges, or surfaces may be represented in various manners, e.g. non-uniform rational B-splines (NURBS). Specifically, a CAD file contains specifications, from which geometry may be generated, which in turn allows for a representation to be generated. Specifications of a modeled object may be stored in a single CAD file or multiple ones. The typical size of a file representing a modeled object in a CAD system is in the range of one Megabyte per part. And a modeled object may typically be an assembly of thousands of parts.

In the context of CAD, a modeled object may typically be a 3D modeled. By "3D modeled object", it is meant any object which is modeled by data allowing its 3D representation. A 3D representation allows the viewing of the part from all angles. For example, a 3D modeled object, when 3D represented, may be handled and turned around any of its axes, or around any axis in the screen on which the representation is displayed. This notably excludes 2D icons, which are not 3D modeled. The display of a 3D representation facilitates design (i.e. increases the speed at which designers statistically accomplish their task).

The methods are computer-implemented. This means that the steps (or substantially all the steps) of the methods are executed by at least one computer, or any system alike.

Thus, steps of the methods are performed by the computer, possibly fully automatically, or, semi-automatically. In examples, the triggering of at least some of the steps of the methods may be performed through user-computer interaction. The level of user-computer interaction required may depend on the level of automatism foreseen and put in balance with the need to implement user's wishes. In examples, this level may be user-defined and/or pre-defined.

A typical example of computer-implementation of the methods is to perform the methods with a system adapted for this purpose. The system may comprise a processor coupled to a memory and a graphical user interface (GUI), the memory having recorded thereon a computer program comprising instructions for performing the methods. The memory may also store a database. The memory is any hardware adapted for such storage, possibly comprising several physical distinct parts (e.g. one for the program, and possibly one for the database). The system may further comprise a depth sensor coupled to the processor and configured to acquire a depth map of an instance for the 3D reconstruction. The system may also comprise a posing spot for the instance to pose during the acquisition.

Figure 3:
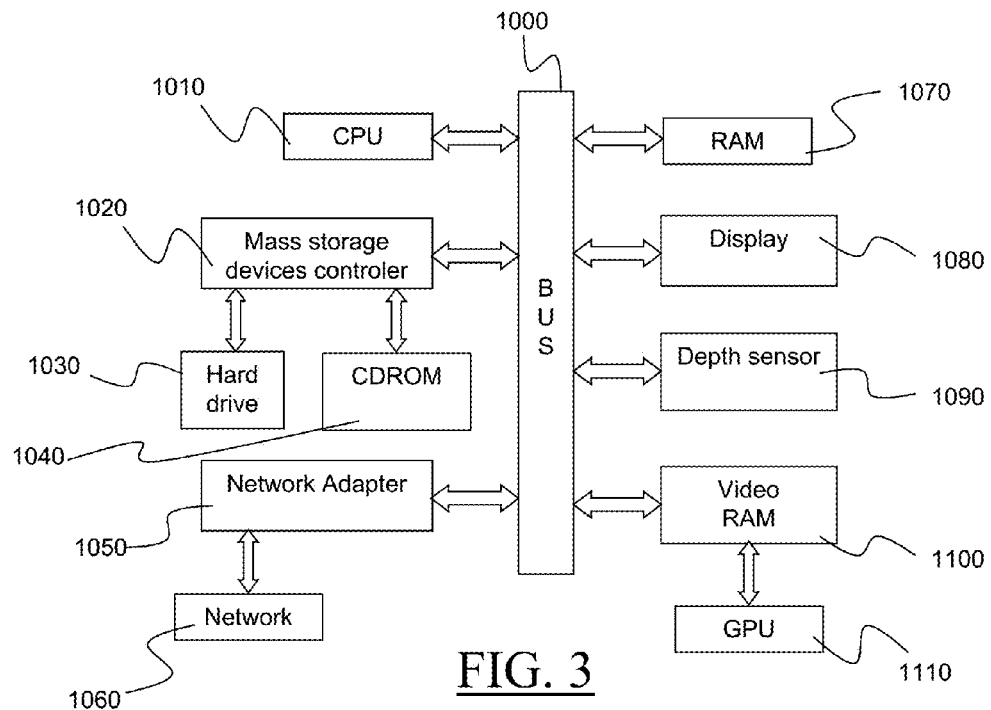
FIG. 3 shows an example of the system.
Figure 4:
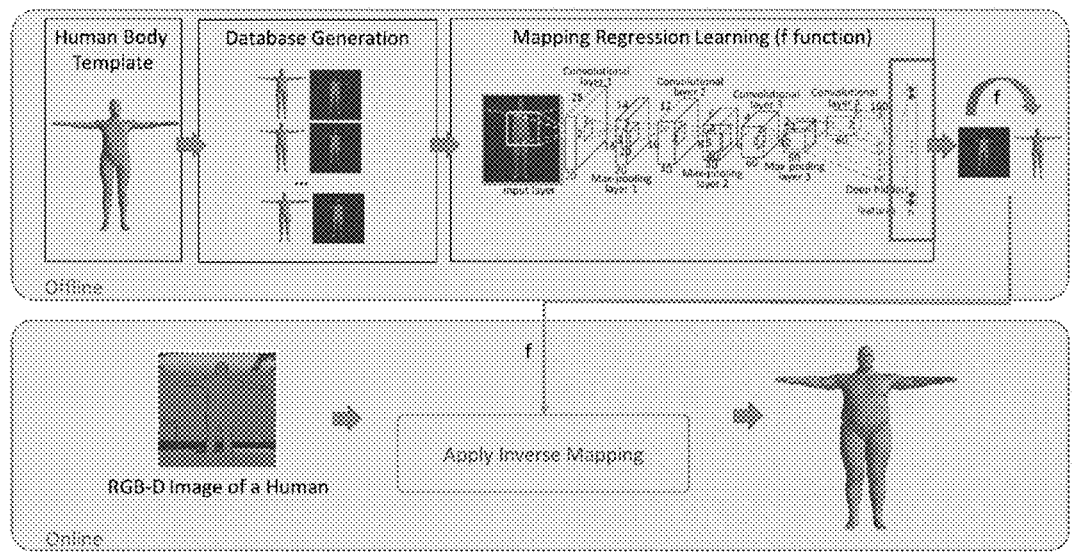
FIGS. 4-10 illustrate examples of the methods and tests thereof.

FIG. 3 shows an example of the system, as computer system connected to a depth sensor.

The system of the example comprises a central processing unit (CPU) 1010 connected to an internal communication BUS 1000, a random access memory (RAM) 1070 also connected to the BUS. The system is further provided with a graphical processing unit (GPU) 1110 which is associated with a video random access memory 1100 connected to the BUS. Video RAM 1100 is also known in the art as frame buffer. A mass storage device controller 1020 manages accesses to a mass memory device, such as hard drive 1030. Mass memory devices suitable for tangibly embodying computer program instructions and data include all forms of nonvolatile memory, including by way of example semiconductor memory devices, such as EPROM, EEPROM, and flash memory devices; magnetic disks such as internal hard disks and removable disks; magneto-optical disks; and CD-ROM disks 1040. Any of the foregoing may be supplemented by, or incorporated in, specially designed ASICs (application-specific integrated circuits). A network adapter 1050 manages accesses to a network 1060. The system may also include a depth sensor 1090.

The computer program may comprise instructions executable by a computer, the instructions comprising means for causing the above system to perform the methods. The program may be recordable on any data storage medium, including the memory of the system. The program may for example be implemented in digital electronic circuitry, or in computer hardware, firmware, software, or in combinations of them. The program may be implemented as an apparatus, for example a product tangibly embodied in a machine-readable storage device for execution by a programmable processor. Method steps may be performed by a programmable processor executing a program of instructions to perform functions of the method by operating on input data and generating output. The processor may thus be programmable and coupled to receive data and instructions from, and to transmit data and instructions to, a data storage system, at least one input device, and at least one output device. The application program may be implemented in a high-level procedural or object-oriented programming language, or in assembly or machine language if desired. In any case, the language may be a compiled or interpreted language. The program may be a full installation program or an update program. Application of the program on the system results in any case in instructions for performing the method.

The 3D reconstruction may be part of a 3D design process. "Designing a 3D modeled object" designates any action or series of actions which is at least part of a process of elaborating a 3D modeled object. The 3D reconstruction may also be part of a virtual try-on simulation, augmented reality, internet of things and video games.

Examples of the methods applied to a class of human bodies and consistent with the examples of FIGS. 1-2 are now discussed with reference to FIGS. 4-10. The examples mention an RGB-D camera but any system with a depth sensor can be implemented (for example pure depth sensing devices, e.g. with no RGB camera). Also, the examples mention 3D modeled objects that take the form of meshes. Other types of 3D modeled objects may be implemented (provided on the parametric model), such as B-Reps.

Prior art optimization-based methods search for the 3D body model parameters each time a new user is presented. The idea of the example methods formulates the problem differently: instead of searching the 3D body model parameters, the methods of the examples make use of machine-learning to learn the direct mapping function from any RGB-D camera depth map to its 3D body model parameters. This is shown in the pipeline represented on FIG. 4. Such a mapping is learnt from a large database of user depth maps with their known body model parameters. Using this idea, the methods of the examples define the learning-based new category of 3D human body reconstruction. Unlike state of the art algorithms, the methods of the examples are faster and achieve real-time performance, which opens up more consumer oriented applications. They require only a depth map image of the user as input and do not require the user to stand in a reference pose. A detailed pipeline of the methods of the examples is shown on FIG. 5.

Figure 5:
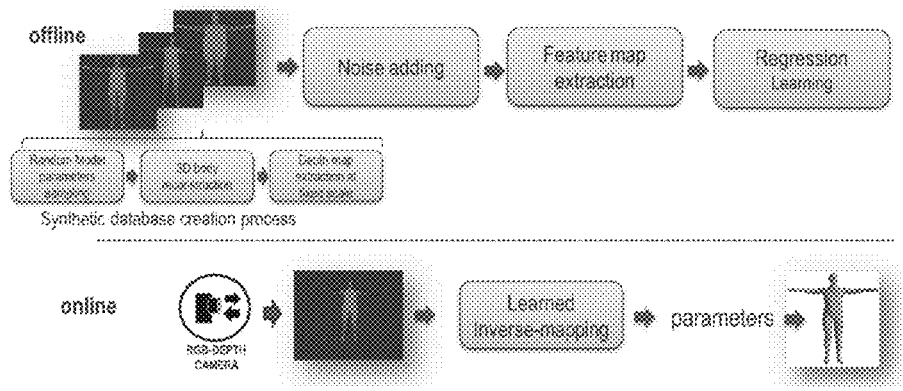

The Offline Learning shown on FIG. 5 is now discussed.

Overview

Straightforward information that can be extracted from a 3D model is its depth map. What the reconstruction method wants is the inverse, starting from a depth map one wants to infer the 3D body model mesh or more exactly its internal parameters (shape and pose). The offline preprocessing learns the mapping function from a synthetically generated database to the model parameters. The method synthetically adds a random noise on the user's contour in order to emulate the noisy RGB-D camera depth acquisition. Both the depth images database with its body model parameters will constitute the learning data.

Synthetic Database Creation

The methods of the examples assume that one is already in possession of a parametric 3D body model that copes with the human body shape and pose variations. This model transforms the pose and shape parameters into a corresponding 3D body model. To construct a depth map database, first, the method may randomly sample the shape and pose parameters space and generate their corresponding 3D body models. Second, the 3D body models may be aligned to a common up vector, the same ground plane and the same scale. Finally, one can extract a depth map per 3D model using a virtual camera.

Noise Adding

The methods of the examples add a random noise (Gaussian) to the database depth maps and especially on the body model contours, to emulate the noisy sensor depth maps. This ensures a high-quality learning and testing on the same depth map image structure.

Feature Map Extraction

The feature extraction part is optional. The method can either use the generated noisy depth maps or extract more discriminant features from the depth maps such as normal maps or any kind of image-represented depth features. The feature extraction's role is to infer more discriminant representations of the depth maps that help the learning algorithm in the next step.

Regression Learning

Starting from the depth map image features database coupled with their model parameters (shape and pose), the methods learn a regression function from the space of feature images to the model parameters. One can solve this regression by exploiting features of deep Convolutional Neural Network (CNN).

Deep Convolutional Neural Network (CNN)

Figure 6:
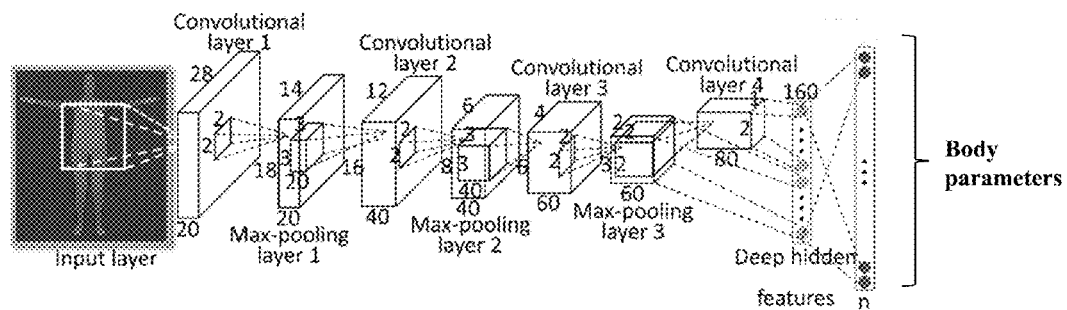

Convolutional neural nets transform an input image by a sequence of simple operations organized as layers as shown on FIG. 6, which represents Convolutional Neural Network architecture. Each layer applies a linear operation followed by a pointwise non-linearity. Formally, the output f(x) of a CNN for an image x represented as vector is:

$$f(x) = \gamma_K(\sigma_K(W_K \ldots \gamma_2(\sigma_2(W_2\gamma_1(\sigma_1(W_1 x))) \ldots)))$$

where the terms $W_k$ are matrices corresponding to linear operations, the functions $\sigma_k$ are pointwise non-linear functions (sigmoids), and the functions $\gamma_k$ perform a down-sampling operations (pooling). For CNN, the matrices $W_k$ have a particular structure and correspond to convolutions of spatial maps.

Training

A test was performed to validate the idea by learning the CNN on the set of depth maps. The loss function was defined to be the Euclidian distance between the predicted and the ground truth parameters.

In the test, the regression CNN was trained using the scheme disclosed in paper "Krizhevsky, I. Sutskever, G. Hinton. *ImageNet Classification with Deep Convolutional Neural Networks*. NIPS, 2012", that is AlexNet architecture, with small changes on the final two layers. The number of outputs of the layer N−1 was changed to the number of body parameters in the examples, while the final layer (layer N) was removed and replaced with a Euclidean Loss Layer that is well-suited for regression problems.

Figure 7:
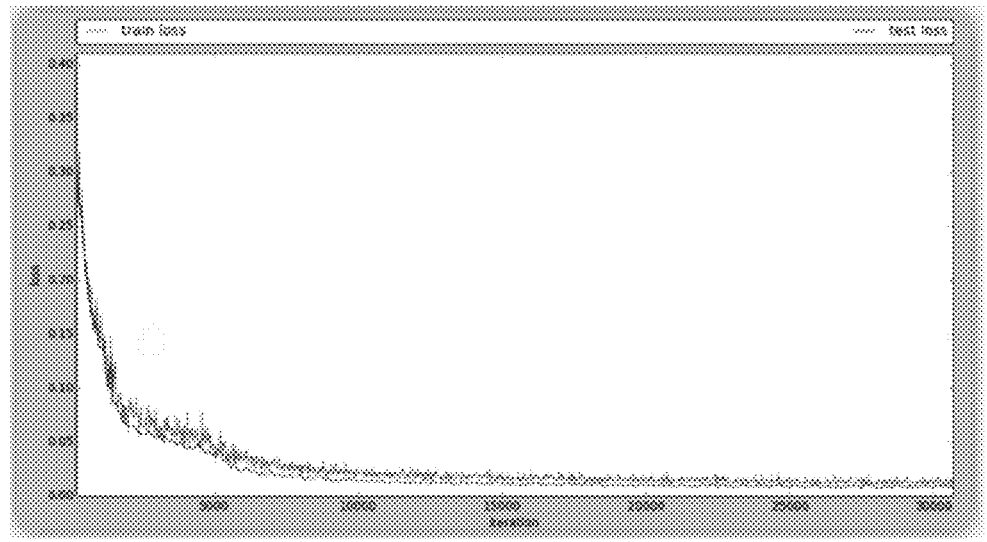

The test used a database of more than 120 k instances, split into 80% for learning and 20% for testing. The test included training the network to find the best parameters of the matrices $W_k$, $\sigma_k$ and $\gamma_k$ and with Stochastic Gradient Descent (SGD) using a batch-based learning of 32 depth images at each iteration. The plot of FIG. 7 shows the evolution of the training and testing loss over time.

The Online phase (in particular Online Testing) shown on FIG. 5 is now discussed.

From a real-time RGB-D acquisition, and using the above pre-learned regression function one can directly estimate the 3D body model parameters of the person.

Figure 8:
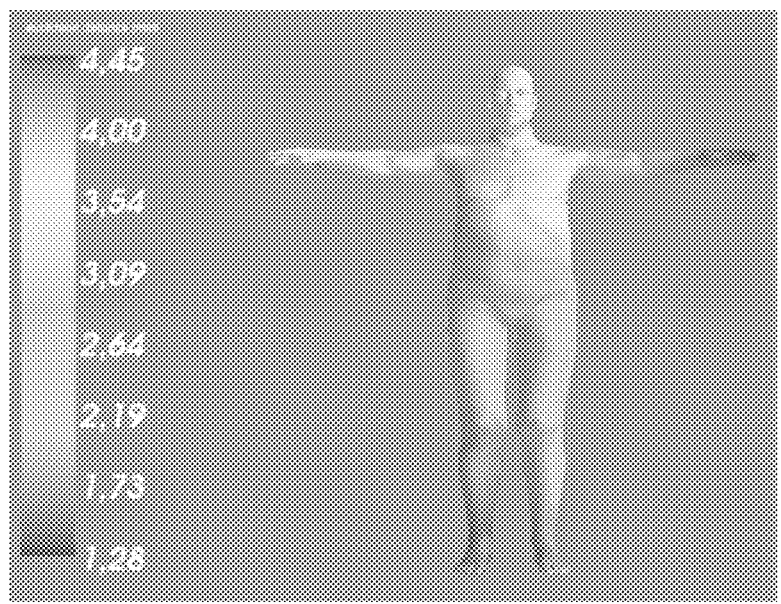

The plot of FIG. 8 shows the predicted 3D body model from a randomly generated synthetic depth map (using random body model parameters). It shows the heat map of the loss function (Euclidean distance) computed between every vertex of the predicted and the ground truth 3D body models. In this plot, for testing purposes, only the shape was predicted and the pose was set to a T reference pose. One can see that the learned regression function predicted well the body shape: the maximum error found was 4.45 mm on a very small set of vertices.

Figure 9:
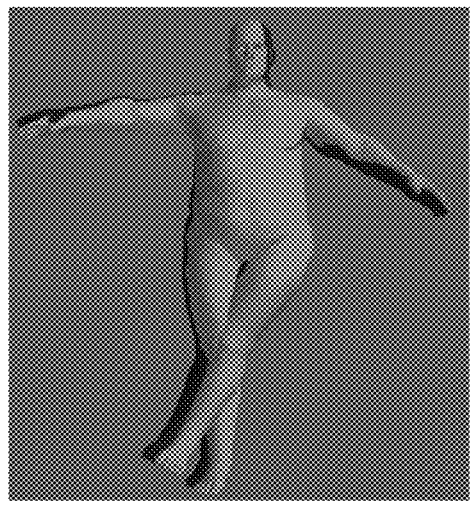
Figure 10:

Another test integrated the pose parameters to the regression learning function. The plots of FIGS. 9-10 show the difference between the predicted (in black) and the ground truth (in grey shade) body models. One can see that the predicted human body was very close to the ground truth model.

This may give a perfect initialization to a pose refinement step using a pose optimization algorithm.

While example embodiments have been particularly shown and described, it will be understood by those skilled in the art that various changes in form and details may be made therein without departing from the scope of the embodiments encompassed by the appended claims.

The invention claimed is:

1. A computer-implemented method for learning a function configured for reconstructing, for a class of real objects, a 3D modeled object that represents an instance of the class from a depth map of the instance, the method comprising:
   providing a parametric model of the class;
   creating a database, the creation of the database including:
      varying parameters of the parametric model to generate 3D modeled objects that each represent a respective instance of the class;
      synthesizing, for each generated 3D modeled object, a respective depth map of the respective instance represented by the generated 3D modeled object;
      associating each synthesized depth map to a corresponding 3D modeled object; and
   learning the function with the database.

2. The method of claim 1, wherein synthesizing a respective depth map for each generated 3D modeled object includes:
   providing a virtual viewpoint; and
   determining a theoretic depth map that represents exact depth from the virtual viewpoint to the generated 3D modeled object.

3. The method of claim 2, wherein synthesizing a respective depth map for each generated 3D modeled object further includes adding a perturbation to the theoretic depth map at least at locations that correspond to contours of the generated 3D modeled object.

4. The method of claim 3, wherein adding a perturbation includes adding a random noise to the depth map.

5. The method of claim 4, wherein the random noise is a Gaussian noise.

6. The method of claim 4, wherein the random noise corresponds to the noise of a depth sensor.

7. The method of claim 1, wherein the class of real objects is a class of human bodies, the 3D modeled object modeling the 3D shape of the instance in the pose of the instance as represented by the depth map, and the parametric model of the class has shape and pose parameters.

8. A computer-implemented method comprising:
   providing a function configured for reconstructing, for a class of real objects, a 3D modeled object that represents an instance of the class from a depth map of the instance,
   the function being learnable by a processor automating:
      receiving a parametric model of the class; and
      creating a database, the creation of the database including:
         varying parameters of the parametric model to generate 3D modeled objects that each represent a respective instance of the class;
         synthesizing, for each generated 3D modeled object, a respective depth map of the respective instance represented by the generated 3D modeled object;

associating each synthesized depth map to a corresponding 3D modeled object; and learning the function with the database.

9. The method of claim 8, further comprising the processor automatically:

obtaining a depth map; and applying the function to the depth map.

10. The method of claim 9, wherein the depth map is acquired by a depth sensor.

11. The method of claim 8, wherein the class of real objects is a class of human bodies, the 3D modeled object models the 3D shape of the instance in the pose of the instance as represented by the depth map, and the parametric model of the class has shape and pose parameters.

12. A device comprising:

a non-transitory memory including instructions for learning a function configured for reconstructing, for a class of real objects, a 3D modeled object that represents an instance of the class from a depth map of the instance; and a processor coupled to the memory implementing the instructions and automatically:

obtaining a parametric model of the class;

creating a database, the creation of the database including:

varying parameters of the parametric model to generate 3D modeled objects that each represent a respective instance of the class;

synthesizing, for each generated 3D modeled object, a respective depth map of the respective instance represented by the generated 3D modeled object;

associating each synthesized depth map to a corresponding 3D modeled object; and learning the function with the database.

13. The device of claim 12, wherein the device forms a data storage medium.

14. The device of claim 12, wherein the processor coupled to the memory forms a computer system.

15. The device of claim 14, further comprising a depth sensor.

16. The device of claim 12, wherein the class of real objects is a class of human bodies, the 3D modeled object models the 3D shape of the instance in the pose of the instance as represented by the depth map, and the parametric model of the class has shape and pose parameters.

17. A device comprising:

a non-transitory memory including instructions providing a function configured for reconstructing, for a class of real objects, a 3D modeled object that represents an instance of the class from a depth map of the instance; and a processor coupled to the memory implementing the instructions, wherein the function is learnable by the processor:

receiving a parametric model of the class; and creating a database, the creation of the database including:

varying parameters of the parametric model to generate 3D modeled objects that each represent a respective instance of the class;

synthesizing, for each generated 3D modeled object, a respective depth map of the respective instance represented by the generated 3D modeled object;

associating each synthesized depth map to a corresponding 3D modeled object; and learning the function with the database.

18. The device of claim 17, wherein the device forms a data storage medium.

19. The device of claim 17, wherein the processor coupled to the memory forms a computer system.

20. The device of claim 19, further comprising a depth sensor.

* * * * *